United States Patent [19]

Sklarchuck et al.

[11] Patent Number: 5,124,120
[45] Date of Patent: Jun. 23, 1992

[54] METHOD FOR MAKING ZINC ELECTRODES FOR ALKALINE-ZINC BATTERIES

[75] Inventors: Jack Sklarchuck, Burlington; Hans Rensing, Rossland, both of Canada

[73] Assignee: Cominco Ltd., Vancouver, Canada

[21] Appl. No.: 553,198

[22] Filed: Jul. 16, 1990

[51] Int. Cl.$^5$ .............................................. B22F 3/10
[52] U.S. Cl. ........................................ 419/47; 419/57
[58] Field of Search ............................. 419/9, 46, 47

[56] References Cited

U.S. PATENT DOCUMENTS

| | | | |
|---|---|---|---|
| 1,223,322 | 4/1917 | Gebauer | 187/49 |
| 1,342,801 | 6/1920 | Gebauer | 419/47 |
| 2,254,549 | 9/1941 | Small | 419/47 |
| 3,325,282 | 6/1967 | Mayer et al. | 419/8 |
| 3,348,976 | 10/1967 | Kelly et al. | 429/229 |
| 3,650,736 | 3/1972 | Broom | 75/200 |
| 3,655,447 | 4/1972 | Griffiths et al. | 136/30 |
| 3,663,297 | 5/1972 | Weller | 419/8 |
| 4,011,077 | 3/1977 | Kaufman | 75/212 |
| 4,155,754 | 5/1979 | Lynn | 75/200 |
| 4,591,480 | 5/1986 | Morishita et al. | 419/9 |

*Primary Examiner*—Brooks H. Hunt
*Assistant Examiner*—Daniel J. Jenkins
*Attorney, Agent, or Firm*—Arne I. Fors

[57] ABSTRACT

A method for making zinc electrodes for alkaline-zinc batteries comprising the steps of: mixing an amount of a zinc-magnesium binder alloy with an amount of a material chosen from zinc and a second zinc-magnesium alloy to form a mechanical mixture. The melting temperature of the material is at least 15 Celsius degrees higher than the melting temperature of the binder alloy. The mixture is applied to a current collector and the current collector with applied mixture is heated to a temperature at which incipient melting of the binder alloy causes sintering of the mixture with the formation of a coherent layer solidly bonded to the current collector. The compositions and the amount of the binder alloy and the second alloy are selected such that the active material in the layer of the electrode contains no more than about 15% magnesium, preferably no more than about 10% magnesium. In various embodiments, a binder alloy containing 45% to 55% Mg is eutectically sintered with zinc or a second alloy containing from >0% to about 10% Mg, a binder alloy containing about 3% to 4% Mg is eutectically sintered with a second alloy containing either about 20% to 43% Mg is eutectically sintered with a second alloy containing either about 20% to 43% Mg or about 52% to 80% Mg, and a binder alloy containing either about 41% to 50% Mg or containing about 1.5% to 3% is eutectically sintered with zinc.

21 Claims, 1 Drawing Sheet

METHOD FOR MAKING ZINC ELECTRODES FOR ALKALINE-ZINC BATTERIES

This invention relates to a method for making zinc electrodes for alkaline zinc batteries and, more particularly, to a method for making zinc electrodes by eutectic sintering.

BACKGROUND OF THE INVENTION

An alkaline zinc battery consists of at least one positive electrode, at least one negative zinc electrode, separators to keep the electrodes from touching each other and a cell case and connectors. Ideally, the zinc electrode should be made of zinc but the fabrication of a suitable electrode made of zinc has up until now not been successful. Zinc electrodes are presently mainly made of zinc oxide and additives applied to a substrate or grid. The battery has an energy density higher than, but a cycle life shorter than a lead-acid battery.

There are two reasons for the short cycle life. When zinc metal is converted to zinc oxide in an alkaline electrolyte during discharging, the zinc oxide dissolves into the electrolyte until the solution is saturated. When the cell is being recharged, that dissolved zinc oxide is plated out of solution in the form of metallic zinc. When zinc is plated out of an alkaline electrolyte, "dendrites" form. The dendrites will eventually penetrate the separators and cause a short-circuit that causes the cell to discharge at a high current. Eventually, the cell will no longer be able to be recharged or even sustain an open circuit voltage.

Dendrites tend to form predominantly during charging of the battery, and especially during the overcharge portion of the charge cycle. The formation of dendrites is avoided to some extent by special charging techniques and by maintaining an excess of zinc oxide in the zinc electrode.

The second reason for the short cycle life is that zinc electrodes are made by applying some composition of zinc, zinc oxide and certain additives to a suitable current collector. The current collector may be made of a metal such as copper. The zinc metal and/or zinc oxide particles are usually held together and to the current collector by some polymer material. During cycling, the active material of the zinc electrode tends to shift towards the bottom and bottom center of the electrode. This not only reduces the surface area of the active portion of the electrode, but also leads to the formation of dendrites because the current (especially when charging) becomes concentrated on a smaller area.

BRIEF DESCRIPTION OF PRIOR ART

Zinc electrodes have been made by applying a paste of active material comprising zinc, zinc oxide and additives to a current collector. The paste is usually pressed onto and held on the current collector or grid by a binding additive or a polymer material. The active materials have also been applied to a current collector by roll-bonding, pressure-bonding, compaction or sintering.

According to French Patent 2 484 146, a paste of a powder mixture of 84% Zn and 16% Mg with a cellulose acetate binder and water is pressure molded on a grid support plate, and the plate is dried and sintered at 500°–600° C. According to U.S. Pat. No. 3,655,447, a porous zinc electrode for batteries is made by compacting a mixture of zinc powder, a filler and a mercury chloride solution and heating the pressed material at 405°–420° C. to give a felt-like structure containing interlocked rod-like zinc particles. U.S. Pat. No. 3,663,297 discloses a method for making a zinc powder electrode by covering a packed mixture of cleaned zinc powder around a grid in a mould, followed by cold welding and pressing of the materials in the mould. According to U.S. Pat. No. 3,348,976, a sintered electrode for a battery is made from zinc powder initially containing a sublimable salt. Powder and salt are compressed, the salt is removed by sublimation (under vacuum) and the compressed material is heated for the formation of a porous zinc structure. According to French Patent 1 004 463, the active material of a zinc anode for a nickel-zinc battery may consist of zinc oxide or zinc powder with 10% to 20% added magnesium powder, the powder mixture is pressed as a paste onto a grid of zinc or magnesium. Tomassi, W. (Chem. Abs. 81:138455f, 98440p, 130154m and 98552b) has studied the electrode potentials, the corrosion, migration kinetics and x-ray diffractions of negative electrodes for metal-oxygen cells, and, particularly, of zinc electrodes with additions of magnesium, aluminum, their alloys and mixtures. The porous electrodes are made by die-pressing of powdered mixtures of zinc with aluminum powder and/or magnesium powder in amounts of 5–20% Mg and 5–40% Al, respectively.

SUMMARY OF THE INVENTION

It has now been found that a zinc electrode for use in an alkaline zinc battery may be made by eutectic sintering of mixtures of zinc-magnesium alloys or of zinc and zinc-magnesium alloys on a suitable metal substrate, grid or current collector.

More specifically, a mixture of particulate forms of two zinc-magnesium alloys or a mixture of particulate forms of a zinc-magnesium alloy and zinc is applied to a suitable metal current collector, and the current collector with the applied mixture is heated to a temperature at which eutectic sintering causes the formation of an electrode with a coherent sintered layer of zinc and zinc-magnesium alloy or of zinc-magnesium alloy on the current collector and solidly bonded to the current collector. Eutectic sintering is effected by selecting the compositions of the zinc-magnesium alloys such that one alloy acts as a binder, named binder alloy hereinafter, for the other alloy, named second alloy hereinafter, or for the zinc. In the case of using a mixture of two zinc-magnesium alloys, the composition of the binder alloy may be about either the composition of the first eutectic composition (Zn-50% Mg) or the composition of the second eutectic composition (Zn-3% Mg). The composition of the second alloy in the mixture is selected from zinc-magnesium alloys that have a melting temperature that is at least about 15 Celsius degrees higher than the melting temperature of the binder alloy.

In the case of using a mixture of a binder alloy and zinc, the composition of the binder alloy is of about either the first or the second eutectic composition, provided the melting temperature of the binder alloy is at least 15 Celsius degrees lower than the melting temperature of zinc.

In both cases, the amount of magnesium in the active material of the electrode should be less than about 15% magnesium, preferably, less than about 10% magnesium. Either one of the zinc-magnesium alloys may contain a small amount of at least one additive metal capable of reducing the hydrogen overvoltage or capable of increasing the porosity of the electrode. In the following, all percentages are percentages by weight.

According to a first embodiment of the invention, zinc and magnesium are alloyed to form a binder alloy and a second alloy in particulate form. The particle sizes of the binder alloy are preferably smaller than those of the second alloy. The binder alloy has a relatively high magnesium content of about the first eutectic composition containing in the range of about 45 to 55% magnesium. The second alloy has a relatively low content of magnesium containing in the range from >0% to about 10% magnesium. The compositions of the binder and the second alloys are chosen such that the melting temperature of the second alloy is at least about 15 Celsius degrees higher than the melting temperature of the binder alloy. The alloys in particulate form are mixed to form a mixture containing the alloys in a desired weight ratio. The weight ratio of binder alloy to second alloy is in the range of about 1:1 to about 1:9. The ratio is mainly determined by the requirements that the active material of the electrode should contain no more than about 15% magnesium, preferably no more than about 10% magnesium, and that the two alloys are adequately bonded upon sintering. The mixture of pulverized alloys is then applied, without binding additives, to a suitable current collector. The current collector with applied alloy mixture is heated to a temperature high enough to cause incipient melting of the binder alloy. The temperature of incipient melting is just above the melting temperature of the binder alloy. Upon incipient melting, particles of the binder alloy with the lower melting point which are in close proximity to particles of the second alloy in the alloy mixture tend to dissolve a portion of adjacent particles of the second alloy, thereby enriching the alloy with the lower magnesium content in the areas of contact. The composition in the areas enriched in magnesium have a higher melting point, and the areas of incipient melting solidify thereby sintering the alloy mixture. The sintered alloy mixture forms a coherent sintered layer of zinc-magnesium alloy on the current collector and solidly bonded thereto.

According to a second embodiment of the invention, zinc and magnesium are alloyed to form two zinc-magnesium alloys in particulate form. The second alloy has a relatively high content of magnesium such as about 20% to 43% or, alternatively, about 52% to 80% with a composition selected from compositions that have a melting temperature that is at least about 15 Celsius degrees higher than the melting temperature of the binder alloy. The binder alloy has a lower content of magnesium such as containing magnesium in the range of about 3% to 4%. The alloys in particulate form are mixed in a weight ratio in the range of about 1:1 to 9:1. As in the first embodiment, the alloy mixture is applied to a suitable current collector and heated to just above the point of incipient melting of the binder alloy causing eutectic sintering.

According to a third embodiment of the invention, zinc powder and magnesium powder are alloyed to form a binder alloy. The alloy may have one of a number of compositions that has a melting temperature at least about 15 Celsius degrees below the melting temperature of zinc (419° C.). Included in the compositions are alloys that contain from about 41% to about 50% magnesium and from about 1.5% to about 3% magnesium. Zinc powder and the alloy in particulate form are mixed in a desired weight ratio, applied to a suitable current collector and heated to just above the point of incipient melting of the binder alloy causing eutectic sintering.

Electrodes formed according to the three embodiments have a layer of coherent eutectic-sintered zinc-magnesium alloy, and can be used directly in an alkaline zinc battery without charging, as the electrodes are already in the charged state.

It is an object of the present invention to provide a method for making an electrode for an alkaline zinc battery.

It is another object to provide a method for making a negative electrode anode for an alkaline zinc battery which has an active material consisting of zinc-magnesium alloy. It is a further object to provide a method for making an anode for an alkaline zinc battery by eutectic sintering of zinc-magnesium alloys.

It is yet another object to provide a charged electrode made according to the method according to the invention. These and other objects of the invention will become clear from the following detailed description.

Accordingly, there is provided a method for making zinc electrodes for alkaline zinc batteries, said electrodes having a layer of active material, said method comprising the steps of: mixing an amount of a zinc-magnesium binder alloy in particulate form with an amount of a material in particulate form chosen from the group consisting of zinc and a second zinc-magnesium alloy to form a mechanical mixture, the melting temperature of said material being at least about 15 Celsius degrees higher than the melting temperature of said binder alloy; applying said mixture to a current collector; heating said current collector with applied mixture to a temperature at which incipient melting of said binder alloy causes sintering of said mixture with the formation of a coherent layer solidly bonded to said current collector, said layer containing active material; and selecting the composition of said binder alloy and the composition of said material and selecting said amount of said binder alloy and said amount of said material such that said active material in said layer contains no more than about 15% magnesium, preferably no more than about 10% magnesium.

Accordingly, there is also provided an electrode for alkaline zinc batteries made according to the method of the invention.

BRIEF DESCRIPTION OF DRAWING

The invention will now be described in detail with reference to the accompanying drawing, wherein.

DETAILED DESCRIPTION

Figure 1:
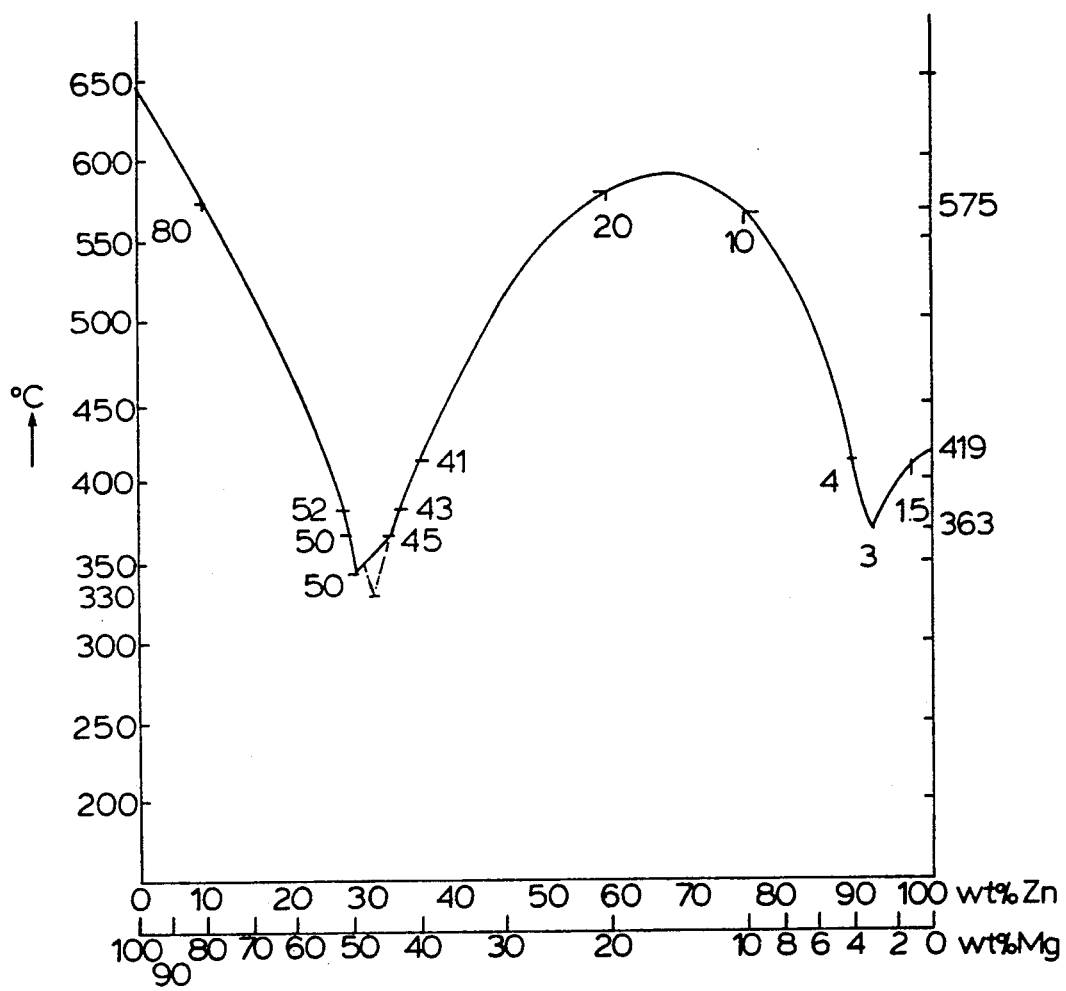
FIG. 1 represents the zinc-magnesium phase diagram.

The present invention is based on some special properties of Zn-Mg alloys arising from the phase diagram as shown in FIG. 1. FIG. 1 is the phase diagram of Mg-Zn as published by Hansen (Max Hansen, Constitution of Binary Alloys, second edition, McGraw Hill Book Company, Inc. 1958, FIGS. 513 and 514). According to Hansen, a eutectic point exists at about 50% Zn melting at 343° C., and a second eutectic exists at about 97% Zn melting at about 363° to 372° C. A eutectoid reaction occurs at a composition with about 53.5% Zn and at about 330° C.

According to the broadest embodiment of the present invention, a mechanical mixture of amounts of a binder alloy of zinc and magnesium of about eutectic composition and a material chosen from the group consisting of zinc and a second alloy of zinc and magnesium is formed. The melting temperature of the material, i.e. zinc or second alloy, is at least about 15 Celsius degrees higher than the melting temperature of the binder alloy. The mixture is applied to a suitable current collector. The current collector with applied mixture is heated in a suitable container to a temperature just above the temperature at which incipient melting of the binder alloy causes sintering of the mixture with the formation of a zinc electrode having a coherent layer solidly bonded to the current collector and having active material containing no more than about 15%, preferably no more than 10% magnesium.

The binder alloy and the second alloy are made by mixing zinc and magnesium in particulate form and in proportions to yield the desired compositions of the alloys, heating the mixture to a temperature suitable to alloy the particulates, such as, for example 500° C., and to form a binder alloy and a second alloy. When alloyed, the molten alloys are solidified in the form of strands or strips which are then pulverized. The alloys are friable and pulverize readily into particulate forms, usually into irregularly shaped flakes. Alternatively, the alloys may be prepared in particulate forms by other methods such as atomization. The particle sizes are, preferably, smaller than about 500 microns. The particle sizes of the binder alloy are, preferably, smaller than those of the second alloy. Most preferably, particle sizes are smaller than about 150 microns with the particle sizes of the binder alloy being smaller than those of the second alloy such as smaller than, for example, 74 microns.

The binder alloy has compositions that contain amounts of magnesium of around the eutectic compositions between zinc and magnesium. The eutectic compositions, as given by Hansen (supra), include the first eutectic and the eutectoid compositions containing about 47% to 55% magnesium, and include the second eutectic composition containing about 3% magnesium. As will be explained, the binder alloy may contain magnesium in ranges of from about 41% to 55% magnesium or from about 1.5% to about 4% magnesium, the selection of binder alloy composition being dependent on the choice of material with which the binder alloy is to be mixed. The material to be mixed with the binder alloy is chosen from the group consisting of zinc and a second zinc-magnesium alloy. The second alloy may contain magnesium in ranges of from >0% to about 10%, from about 20% to 43%, or from about 52% to 80% magnesium. The composition of the binder alloy is chosen such that the melting temperature of the binder alloy is at least about 15 Celsius degrees, preferably at least about 20 Celsius degrees, lower than the melting temperatures of zinc and the second alloy. Either one of or both the binder alloy and the second alloy may contain a small amount of at least one additive metal such as lead, cadmium, mercury or indium capable of reducing hydrogen evolution during charging of the alkaline zinc battery. For example, an amount of lead of about one percent may be used. Either one of or both the alloys may also contain at least one metal, such as for example, aluminum, that is capable of increasing the porosity of an electrode.

In a first embodiment of the invention, the binder alloy has a composition that contains an amount of magnesium in the range of about 45% to about 55%. This range includes the first eutectic and eutectoid compositions according to Hansen (supra). The composition of the binder alloy has melting temperatures in the range of from about 330° C. to about 360° C. The preferred composition is the first eutectic composition containing about 50% magnesium with a melting temperature of about 343° C. The second alloy has a composition that contains an amount of magnesium in the range of >0% to about 10% that have melting temperatures in the range of from about 363° C. to about 575° C. Preferably, the second alloy has compositions that contain magnesium in the range of about 3.5% to about 10% that have melting temperatures in the range of about 380° C. to about 575° C. As will be explained, the compositions of both binder alloy and the second alloy are chosen such that the melting temperature of the second alloy is at least about 15 Celsius degrees, preferably at least about 20 Celsius degrees, higher than that of the binder alloy. Thus, for example, if the binder alloy is of the preferred eutectic composition melting at about 343° C., the second alloy includes all compositions with melting points in the above recited range of 363° C. to 575° C. If the binder alloy melts at, for example, 360° C, only compositions of the second alloy with melting points above about 375° C, preferably above about 380° C., should be selected.

The binder alloy and the second alloy in particulate form, the former having particle sizes generally smaller than the latter, are mixed in the desired weight ratio, to be explained, by any one of a number of methods suitable for the formation of a mechanical mixture of the two alloys. The mixture is applied, without binding additives such as polymers, to a suitable current collector such as, for example, by pressing the mixture onto an expanded mesh of copper, magnesium, silver or other suitable metal. The current collector with the applied mixture is heated to cause eutectic sintering.

The current collector with the applied alloy mixture is heated to a temperature at which incipient melting of the binder alloy in the mixture causes eutectic sintering of the mixture with the formation of a coherent layer solidly bonded to the current collector. The active material in the coherent, solidly bonded layer contains zinc-magnesium alloy. The temperature must be high enough to cause incipient melting of the binder alloy, and is in the range of about 330° C. to about 360° C. corresponding to a temperature just above the melting temperature of the binder alloy (45–55% Mg). Preferably the temperature is about 350° C. corresponding to the melting temperature of the first eutectic composition. The heating is carried out by a suitable method in an inert or a reducing atmosphere, and for a period of time sufficient to form a coherent layer of zinc-magnesium alloy solidly bonded to the current collector.

At the temperature of incipient melting of the binder alloy, the binder alloy begins to melt and, because of contact between particulates of the binder alloy and particulates of the second alloy, tends to dissolve a small portion of particulates of the second alloy in the areas of contact. As soon as this occurs both the binder and the second alloy change composition at the areas of contact between the alloys. The second alloy becomes enriched in magnesium in the areas of contact causing the melting temperature to increase and the alloys to solidify, and thereby sinter. Essentially no liquid phase is formed during eutectic sintering.

The coherent layer on the current collector of the electrode consists of zinc-magnesium alloy. The active component in the layer of alloy is that which contains no more than about 10% magnesium. When the active material in the electrode contains more than about 10% to 15% magnesium, magnesium functions as part of the current collector, and the electrode becomes inactive. In the eutectic sintering, the zinc-magnesium alloy with the lower magnesium content, therefore, essentially determines the amount of active material, while the alloy with the higher magnesium content is substantially inactive. It is also necessary that there is an excess of the amount of the one alloy relative to the amount of the other alloy in the mixture of alloys, so that, together with the particle sizes of the binder alloy being generally smaller than those of the second alloy, many points of contact between particulates of the two alloys provide effective sintering. The weight ratio between the amount of binder alloy and the amount of second alloy is, therefore, chosen in the range of about 1:1 to about 1:9 (50% to 90% second alloy). The preferred ratio is about 1:4. This range of weight ratios ensures that the active material of the electrode, in this case essentially consisting of the second alloy, contains less than about 10% magnesium.

After completion of eutectic sintering, the electrode is allowed to cool. The electrode can be used directly in an alkaline zinc battery without charging as the active material of the electrode is already in the charged state.

In a second embodiment of the invention, the binder alloy has a composition that contains an amount of magnesium in the range of about 3% to about 4%. This range includes the second eutectic composition according to Hansen (supra). The composition of the binder alloy has melting temperatures in the range of from about 363° C. to about 415° C. The preferred composition is the second eutectic composition containing about 3% magnesium with a melting temperature of about 363° C. The second alloy has a composition that contains an amount of magnesium in the range of about 20% to about 43% with melting temperatures in the range of about 378° C. to about 580° C. Alternatively, the second alloy has a composition that contains an amount of magnesium in the range of about 52% to about 80% with melting temperatures in the range of about 378° C. to about 570° C. The compositions of both the Zn-M9 alloys are chosen such that the melting temperature of the second alloy is at least about 15 Celsius degrees, preferably at least about 20 Celsius degrees, higher than that of the binder alloy. Thus, for example, if the binder alloy is of the preferred eutectic composition melting at about 363° C., the second alloy includes all compositions with melting points above about 378° C. If the binder alloy melts at about 415° C., the second alloy includes alloys melting above about 430° C. (about 38% Mg or, alternatively, 56% Mg).

As in the first embodiment, the binder alloy and the second alloy in particulate form are mixed in the desired weight ratio for the formation of a mechanical mixture of the two alloys. To limit the amount of magnesium in the active material of the electrode and to provide effective sintering, as explained above, the weight ratio of binder alloy to second alloy is chosen in the range of about 1:1 to about 9:1 (50% to 90% binder alloy). The preferred ratio is about 4:1. This range of weight ratios ensures that the active material of the electrode, in this case essentially the binder alloy, contains less than about 10% magnesium. The mixture is applied, without binding additives, to a suitable current collector, and the current collector with the applied mixture is heated in an inert or reducing atmosphere to a temperature at which incipient melting of the binder alloy in the mixture causes eutectic sintering with the formation of a coherent layer solidly bonded to the grid. The temperature must be high enough to cause incipient melting of the binder alloy, and is in the range of about 363° C. to about 415° C. and corresponds to the melting temperature of the binder alloy (3-4% Mg). Preferably the temperature is about 363° C. corresponding to the melting temperature of the second eutectic composition. After completion of eutectic sintering, the electrode is allowed to cool, and is ready for use in an alkaline zinc battery.

In a third embodiment of the invention, particulate forms of either a first or a second binder alloy and zinc are mixed to form a mechanical mixture. The first binder alloy has a composition that contains an amount of magnesium in the range of about 41% to about 50%. This range includes the first eutectic and eutectoid compositions according to Hansen (supra). The composition of the first binder alloy has melting temperatures in the range of from about 330° C. to about 404° C. The preferred composition is the eutectic composition containing about 50% magnesium with a melting temperature of about 343° C. The zinc has a melting temperature of about 419° C. Alternatively, the second binder alloy has a composition that contains an amount of magnesium in the range of from about 1.5% to about 3% with melting temperatures in the range of from about 363° C. to about 404° C.

The first or the second binder alloy and the zinc in particulate form are mixed in the desired weight ratio for the formation of a mechanical mixture. For reasons given above, the weight ratio between binder alloy and zinc is chosen in the range of about 1:1 to about 1:9 (50% to 90% zinc), the preferred ratio being about 1:4. The mixture is applied, without binding additives, to a suitable current collector, and the current collector with the applied mixture is heated in an inert or reducing atmosphere to a temperature at which incipient melting of the binder alloy in the mixture causes eutectic sintering with the formation of a coherent layer solidly bonded to the grid. The temperature must be high enough to cause incipient melting of the first binder alloy, and is in the range of about 330° C. to about 404° C. and corresponds to the melting temperature of the first binder alloy (41-50% Mg). Preferably the temperature is about 350° C. corresponding to the melting temperature of the first eutectic composition. Alternatively, the temperature is in the range of about 363° C. to about 404° C. and corresponds to the melting temperature of the second binder alloy (1.5-3.5% Mg). Preferably, the temperature is about 363° C. corresponding to the melting temperature of the second eutectic composition.

At the temperature of incipient melting of the binder alloy, the binder alloy begins to melt and, because of contact between particulates of the binder alloy and particulates of the zinc, tries to dissolve the zinc in the areas of contact. As soon as this occurs both the zinc and the binder alloy change composition at the areas of contact, the magnesium content of binder alloy is lowered causing the melting temperature to increase, and the alloy solidifies and sinters with the zinc.

Upon completion of eutectic sintering the electrode is allowed to cool. The electrode can be used directly in an alkaline zinc battery without charging as the active material of the electrode is already in the charged state. In the electrodes made according to the third embodiment using the first binder alloy (41-50% Mg), zinc is essentially the active material, while in electrodes using the second binder alloy (1.5-3% Mg), the active material comprises both zinc and second binder alloy.

Electrodes made according to the method of the invention are suitable for use in alkaline zinc batteries such as, for example, nickel-zinc, silver-zinc, zinc-air, zinc-oxygen, zinc-manganese dioxide batteries and the like.

The invention will now be illustrated by means of the following non-limitative examples.

EXAMPLE 1

12g of Zn-10% Mg alloy with particle sizes smaller than 74 microns was blended with 8g of Zn-50% Mg alloy as binder alloy and having particle sizes smaller than 32 microns (weight ratio 2:3). The blend was spread on an expanded copper mesh current collector, and the current collector with applied mixture was placed in a spring-loaded graphite mould, which was inserted in a muffle furnace heated to 575° C. After 60 minutes, the mould was removed from the furnace, cooled, and the electrode was recovered. The electrode had a coherent hard metallic layer of zinc-magnesium alloy solidly bonded to the current collector.

The electrode was tested in a nickel-zinc cell with 35% KOH electrolyte for 80 full capacity discharge cycles, the cell being recharged after each cycle with a 25% overcharge. After the 80 cycles, the performance had decreased from 78% of nominal capacity to 58%. In comparison, three conventional zinc oxide-containing electrodes were simultaneously tested. After only 20 cycles, the performance had decreased from 80% to 40% of nominal capacity.

After cycling, the electrodes were removed from the cells. The Zn-Mg-based electrode showed some shape deformation, while the change in shape of the zinc-oxide electrodes was severe. The Zn-Mg-based electrode had no dendritic growths. The Zn-Mg-based zinc electrode has a longer cycle life than conventional zinc oxide-containing electrodes.

EXAMPLE 2

A blend of 12 g zinc powder (<32 microns) and 3 g Zn-50% Mg alloy (<32 microns) (weight ratio of binder alloy to zinc is 1:4) was applied to an expanded copper mesh current collector and treated for eutectic sintering at 375° C. in a graphite mould as described in Example 1. After sintering, the electrode was found to have a hard coherent layer of zinc/zinc-magnesium alloy solidly bonded to the current collector. In testing the electrode in a nickel-zinc cell as in Example 1, the performance decreased over 100 cycles from 82% to 50% of nominal capacity.

EXAMPLE 3

A blend of 10 g of Zn-7% Mg (<74 microns) and 5 g of Zn-50% Mg (<32 microns) (weight ratio 1:2) was applied to a copper current collector and sintered at 390° C. in a graphite mould as described in Example 1. The electrode had a coherent hard metal layer of zinc-magnesium alloy solidly bonded to the current collector.

Tested as in example 1, the performance decreased over 200 cycles from 86% to 35% of nominal capacity.

EXAMPLE 4

12 g of coarse particles Zn-7% Mg alloy were mixed with 16 g of coarse particles of Zn-50% Mg alloy. The mixture was applied to a copper current collector, placed in a mould and sintered at 375° C. as described in Example 1. The electrode had a coherent metal layer of zinc-magnesium alloy somewhat softer than the layers of the previous example, but solidly bonded to the current collector. The electrode was compressed and then tested as in Example 1. During testing, the performance increased from 20% of nominal capacity after one cycle to 85% after 25 cycles, and then gradually decreased during subsequent cycles to 45% after 300 cycles.

EXAMPLE 5

Three electrodes were made by applying a mixture of two zinc-magnesium alloys, having particle sizes of <500 microns, to a magnesium grid substrate and sintering at 375° C. for a time sufficient to produce the electrode with a coherent, hard metallic layer of zinc-magnesium alloy. The electrodes were cycled in a cell containing a 35% KOH electrolyte, as described in Example 1.

The electrode compositions and cycling results are given in Table I.

TABLE I

| No. | Electrode Alloys | Weight | Cycles No. | Capacity* Initial | Final |
|---|---|---|---|---|---|
| 1 | Zn-5% Mg | 30 g | 300 | 30% | 15% |
|   | Zn-50% Mg | 15 g |     |     |     |
| 2 | Zn-7% Mg | 30 g | 500 | 30% | 25% |
|   | Zn-50% Mg | 15 g |     |     |     |
| 3 | Zn-10% Mg | 30 g | 550 | 30% | 8% |
|   | Zn-50% Mg | 15 g |     |     |     |

*percentage of theoretical

Electrode 1 failed after 6 months due to a corroded connector. Electrodes 2 and 3 did not show failure after 8 months and could have been cycled longer.

EXAMPLE 6

The following Table II illustrates that coherent, hard, metallic layers of eutecticly sintered Zn-Mg alloys or Zn and Zn-Mg alloy can be made by mixing a material consisting of Zn-Mg alloys containing 1 to 10% Mg or zinc in particulate form with Zn - 50% Mg binder alloy in particulate form applying the mixture to a copper or magnesium substrate and eutecticly sintering at sintering temperatures from 350° to 525° C. with holding times at the sintering temperatures of from zero to 60 minutes. Except in tests 6, 8 and 10, the average particle sizes of the binder alloy were smaller than those of the second alloy and the zinc.

TABLE II

| TEST NO | SECOND ALLOY OR ZINC COMPOSITION IN % | PARTICLE SIZES IN MICRONS | MELTING TEMP. IN °C. | WEIGHT RATIO BINDER TO SECOND ALLOY | SINTERING TEMP. IN °C. | TIME AT SINTER. TEMP. IN MINUTES | QUALITY OF SINTERED LAYER |
|---|---|---|---|---|---|---|---|
| 1 | Zn-1 Mg | <74 | 410 | 1:2 | 380 | — | hard, metallic |
| 2 | Zn-1 Mg-1 Pb | — | — | 1:2 | 400 | — | hard in places, softer in others |
| 3 | Zn-4 Mg | <74 | 410 | 1:2 | 380 | — | hard, metallic |

TABLE II-continued

| TEST NO | COMPOSITION IN % | SECOND ALLOY OR ZINC PARTICLE SIZES IN MICRONS | MELTING TEMP. IN °C. | WEIGHT RATIO BINDER TO SECOND ALLOY | SINTERING TEMP. IN °C. | TIME AT SINTER. TEMP. IN MINUTES | QUALITY OF SINTERED LAYER |
|---|---|---|---|---|---|---|---|
| 4 | Zn-4 Mg | >44, <104 | 410 | 1:2 | 360 | 10 | hard, metallic |
| 5 | Zn-4 Mg | <150 | 410 | 1:2.3 | 350 | — | hard |
| 6 | Zn-5 Mg-1 Pb | <500 | — | 1:2 | 375 | 0 | hard, shiny metallic |
| 7 | Zn-7 Mg | <74 | 525 | 1:1.3 | 365 | — | hard, metallic |
| 8 | Zn-7 Mg-1 Pb | <500 | — | 1:2 | 375 | 0 | hard, shiny metallic |
| 9 | Zn-10 Mg | <74 | 575 | 1:15 | 575 | 60 | hard, metallic |
| 10 | Zn-10 Mg-1 Pb | <500 | — | 1:2 | 375 | 0 | hard, shiny metallic |
| 11 | Zn-2.5 Mg + Zn-7 Mg | <150 | 380 and 575 | 1:3 | 410 | 60 | hard |
| 12 | 100 Zn | >74, <150 | 419 | 1:2.5 | 355 | 20 | hard, metallic |
| 13 | 100 Zn | <32 | 419 | 1:4 | 375 | — | hard, metallic |
| 14 | 100 Zn | <74 | 419 | 1:2 | 380 | — | hard, metallic |

EXAMPLE 7

The following Table III illustrates further examples of coherent layers of eutecticly sintered Zn-Mg alloys that were made according to the embodiments of the invention. The particle sizes of the alloys were smaller than 74 microns. The sintering temperature was 470° C. The alloys were mixed in different weight ratios and the sinter quality determined. The alloy compositions, the ratio and the sinter quality are given in Table III.

TABLE III

| Alloy 1 | Alloy 2 or Zn | weight ratio alloy 1:alloy 2 | sinter quality |
|---|---|---|---|
| Zn-45% Mg | Zn-2% Mg | 1:1 | hard |
| Zn-45% Mg | Zn-2% Mg | 4:1 | hard |
| Zn-40% Mg | Zn-3% Mg | 1:9 | slightly sintered |
| Zn-40% Mg | Zn-3% Mg | 1:2 | hard |
| Zn-40% Mg | Zn-3% Mg | 1:1 | hard |
| Zn-40% Mg | Zn-3% Mg | 4:1 | weak |
| Zn-20% Mg | Zn-3% Mg | 1:1 | hard |
| Zn-20% Mg | Zn-3% Mg | 4:1 | frangible |
| Zn-20% Mg | Zn-3% Mg | 6:1 | weak |
| Zn-40% Mg | Zn | 1:9 | weak |
| Zn-40% Mg | Zn | 1:4 | hard |
| Zn-3% Mg | Zn | 2:1 | very hard |
| Zn-3% Mg | Zn | 3.5:1 | very hard |

It is understood that changes and modifications can be made in the method of the invention without departing from the scope and purview of the appended claims according to one such modification, zinc-magnesium alloy that is substantially inert in an alkaline solution, such as, for example, alloy containing about 50% magnesium may be used as the current collector. Zinc-magnesium alloy in particulate form, as second alloy, may be applied to the Zn-Mg current collector, and the assembly heated to eutecticly sinter the second alloy to the current collector.

We claim:

1. A method for making zinc electrodes for alkaline zinc batteries, said electrodes having a layer of active material, said method comprising the steps of: mixing an amount of a zinc-magnesium binder alloy in particulate form with an amount of a material in particulate form chosen from the group consisting of zinc and a second zinc-magnesium alloy to form a mechanical mixture, the melting temperature of said material being at least 15 Celsius degrees higher than the melting temperature of said binder alloy, applying said mixture to a current collector; heating said current collector with applied mixture to a temperature at which incipient melting of said binder alloy causes sintering of said mixture with the formation of a coherent layer solidly bonded to said current collector, said layer containing active material; and selecting the composition of said binder alloy and the composition of said material and selecting said amount of said binder alloy and said amount of said material such that said active material in said layer contains no more than about 15% magnesium.

2. A method as claimed in claim 1, wherein said active material in said layer contains no more than about 10% magnesium.

3. A method as claimed in claim 2, wherein the melting temperature of said material is at least about 20 Celsius degrees higher than the melting temperature of said binder alloy.

4. A method as claimed in claim 2, wherein said heating is carried out in an inert or a reducing atmosphere for a period of time sufficient for the formation of said coherent layer.

5. A method as claimed in claim 2, wherein said material is a second zinc-magnesium alloy, said binder alloy has a composition that contains magnesium in an amount in the range of about 45% to about 55%, said binder alloy has a melting temperature in the range of about 330° C. to about 360° C., said second alloy has a composition that contains magnesium in an amount in the range of from >0% to about 10%, said second alloy has a melting temperature in the range of about 363° C. to about 575° C., choosing the composition of said binder alloy and the composition of said second alloy such that the melting temperature of said second alloy is at least about 15 Celsius degrees higher than the melting temperature of said binder alloy, and said mechanical mixture contains an amount of said binder alloy and an amount of said second alloy in a weight ratio of binder alloy to second alloy in the range of from about 1:1 to about 1:9.

6. A method as claimed in claim 5, wherein said binder alloy contains magnesium in an amount of about 50%.

7. A method as claimed in claim 5, wherein said second alloy contains magnesium in an amount in the range of about 3.5% to about 10%, and said second alloy has a melting temperature in the range of about 380° C. to about 575° C.

8. A method as claimed in claim 5, wherein said weight ratio is about 1:4.

9. A method as claimed in claim 2, wherein said material is a second zinc-magnesium alloy, said binder alloy has a composition that contains magnesium in an amount in the range of about 3% to about 4%, said binder alloy has a melting temperature in the range of about 363° C. to about 415° C., said second alloy has a composition that contains magnesium in an amount in the range of about 20% to about 43%, said second alloy has a melting temperature in the range of about 378° C. to about 580° C., choosing the composition of said binder alloy and the composition of said second alloy such that the melting temperature of said second alloy is at least about 15 Celsius degrees higher than the melting temperature of said binder alloy, and said mechanical mixture contains an amount of said binder alloy and an amount of said second alloy in a weight ratio of binder alloy to second alloy in the range of from about 1:1 to about 9:1.

10. A method as claimed in claim 9, wherein said binder alloy contains magnesium in an amount of about 3%.

11. A method as claimed in claim 9, wherein said weight ratio is about 4:1.

12. A method as claimed in claim 1, wherein said material is a second zinc-magnesium alloy, said binder alloy has a composition that contains magnesium in an amount in the range of about 3% to about 4%, said binder alloy has a melting temperature in the range of about 363° C. to about 415° C., said second alloy has a composition that contains magnesium in an amount in the range of about 52% to about 80%, said second alloy has a melting temperature in the range of about 378° C. to about 570° C., choosing the composition of said binder alloy and the composition of said second alloy such that the melting temperature of said second alloy is at least about 15 Celsius degrees higher than the melting temperature of said binder alloy, and said mechanical mixture contains an amount of said binder alloy and an amount of said second alloy in a weight ratio of binder alloy to second alloy in the range of from about 1:1 to about 9:1.

13. A method as claimed in claim 12, wherein said binder alloy contains magnesium in an amount of about 3%.

14. A method as claimed in claim 12, wherein said weight ratio is about 4:1.

15. A method as claimed in claim 2, wherein said material is zinc, said binder alloy has a composition that contains magnesium in an amount in the range of about 41% to about 50%, said binder alloy has a melting temperature in the range of about 330° C. to about 404° C., choosing the composition of said binder alloy such that the melting temperature of zinc is at least about 15 Celsius degrees higher than the melting temperature of said binder alloy, and said mechanical mixture contains an amount of said binder alloy and an amount of zinc in a weight ratio of binder alloy to zinc in the range of from about 1:1 to about 1:9.

16. A method as claimed in claim 15, wherein said binder alloy contains magnesium in an amount of about 50%.

17. A method as claimed in claim 15, wherein said weight ratio is about 1:4.

18. A method as claimed in claim 2, wherein said material is zinc, said binder alloy has a composition that contains magnesium in an amount in the range of about 1.5% to about 3%, said binder alloy has a melting temperature in the range of about 336° C. to about 404° C., choosing the composition of said binder alloy such that the melting temperature of zinc is at least about 15 Celsius degrees higher than the melting temperature of said binder alloy, and said mechanical mixture contains an amount of said binder alloy and an amount of zinc in a weight ratio of binder alloy to zinc in the range of from about 1:1 to about 1:9.

19. A method as claimed in claim 18, wherein said binder alloy contains magnesium in an amount of about 3%.

20. A method as claimed in claim 18, wherein said weight ratio is about 1:4.

21. A method as claimed in claim 1, wherein said composition of said binder alloy is chosen from about the eutectic compositions between zinc and magnesium.

* * * * *